(12) United States Patent
Boskovic et al.

(10) Patent No.: US 7,394,944 B2
(45) Date of Patent: Jul. 1, 2008

(54) METHOD AND SYSTEM FOR FINDING SPATIAL MEDIANS IN A SLIDING WINDOW ENVIRONMENT

(75) Inventors: Ronald Boskovic, Campbell, CA (US); Jason Harris, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 844 days.

(21) Appl. No.: 10/412,516

(22) Filed: Apr. 11, 2003

(65) Prior Publication Data

US 2004/0202379 A1 Oct. 14, 2004

(51) Int. Cl.
*G06K 9/40* (2006.01)
(52) U.S. Cl. ...................................... 382/262
(58) Field of Classification Search ........................ None
See application file for complete search history.

(56) References Cited

U.S. PATENT DOCUMENTS

| | | | |
|---|---|---|---|
| 4,603,430 A | 7/1986 | Sacks | |
| 5,297,036 A | 3/1994 | Grimaud | |
| 5,671,264 A * | 9/1997 | Florent et al. | 378/98 |
| 5,798,846 A | 8/1998 | Tretter | |
| 5,812,702 A | 9/1998 | Kundu | |
| 6,192,079 B1 | 2/2001 | Sharma et al. | |
| 6,295,384 B1 * | 9/2001 | Into | 382/275 |
| 6,532,310 B1 | 3/2003 | Into | |
| 7,130,480 B2 * | 10/2006 | Betrisey et al. | 382/260 |
| 2001/0034749 A1 | 10/2001 | Jiang | |

OTHER PUBLICATIONS

Sliding-Window Filtering: An Efficient Algorithm for Incremental Mining Chang-Hung Lee, et al. pp. 263-270, Nov. 2001.
FPGA Implementation of Median Filter Rajul Maheshwari, et al. pp. 523-524, Jan. 1997.

* cited by examiner

*Primary Examiner*—Matthew C Bella
*Assistant Examiner*—Alex Liew

(57) ABSTRACT

A method for determining a median value in a sliding window environment is provided. The method includes creating a merge tree defining leaf nodes associated with columns corresponding to a first position of a sliding window. A display controller and a computer readable medium having program instructions for determining a median value in a sliding window environment are also provided.

2 Claims, 14 Drawing Sheets

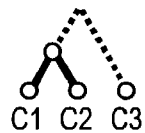
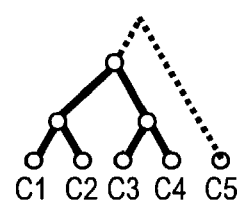
Fig. 6A            Fig. 6B
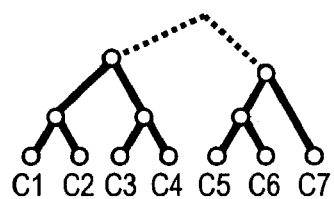
Fig. 6C
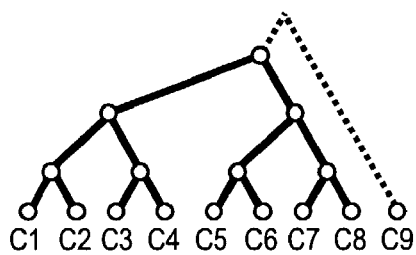
Fig. 6D
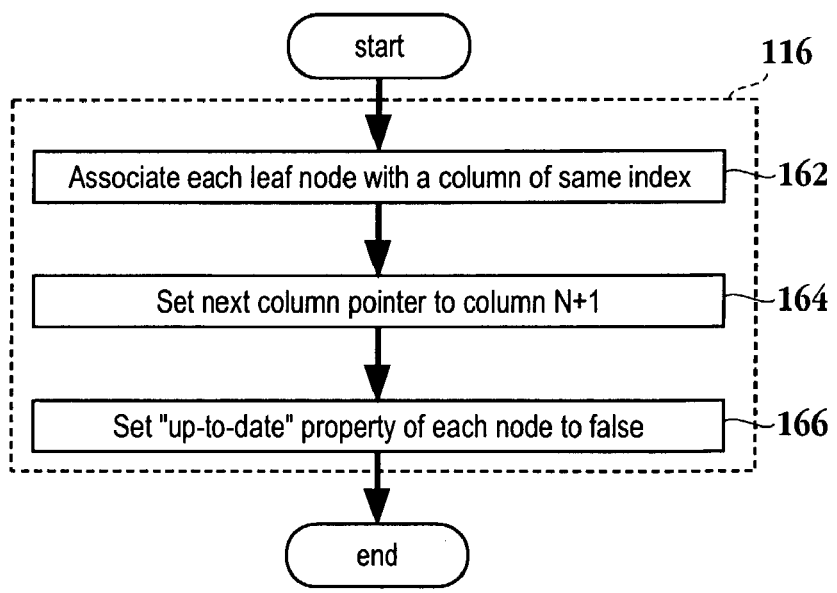
Fig. 7

METHOD AND SYSTEM FOR FINDING SPATIAL MEDIANS IN A SLIDING WINDOW ENVIRONMENT

CROSS REFERENCE TO RELATED APPLICATIONS

This application is related to U.S. patent application Ser. No. 10/368,234, filed on Feb. 18, 2003 and entitled "METHOD AND SYSTEM FOR FINDING A K ORDER STATISTIC IN A UNION OF SORTED SETS." This application is hereby incorporated by reference in its entirety for all purposes.

BACKGROUND OF THE INVENTION

1. Field of the Invention

This invention relates generally to multi-set lookup systems and methods and more particularly to a system and method for determining a median value of image data for filtering noise associated with the presentation of the image data.

2. Description of the Related Art

Many applications require finding a median of a number of values, or a value associated with a particular rank in a union of sets, as sorting is a common task in computer applications. Median filtering is popular for noise removal and employed extensively in applications involving speech, signal and imaging processing. For example, finding a median with respect to image processing allows for images to be smoothed should a pixel value be in error.

One approach for finding a median of a sliding window is to fully sort the set of values and locating the middle value of the sorted set. For a sliding window, the sorted set must be calculated each time the window advances, which demands a significant amount of computational power. FIG. 1 is a simplified schematic diagram of a 3×3 sliding window illustrating the movement of the window over a grid. Grid 100 may be defined over a display screen. Region 102 defines a 3×3 window having nine elements, e.g., nine pixel values. Thus, the nine elements would be sorted and the median located from the sorted elements. The window then slides over one column, i.e., region 104 defines the next 3×3 window. Here again, the nine elements of region 104 are sorted and the median is located. This process is repeated for the entire span of grid 100. Once the sliding window reaches the last column of the right hand side of grid 100, the 3×3 window returns to the left hand side and drops down by one row. One shortcoming of this method is that the number of comparisons is excessive due to the full sorting occurring each time the sliding window advances. Furthermore, the full sorting is discarded after the sliding window advances.

As a result, there is a need to solve the problems of the prior art to provide a method and apparatus for efficiently determining a median value of a sliding window in a more efficient manner that enables the reuse of data generated from previous median value calculations.

SUMMARY OF THE INVENTION

Broadly speaking, the present invention fills these needs by providing a method and device configured to determine a spatial median in a sliding window environment. It should be appreciated that the present invention can be implemented in numerous ways, including as a process, a system, or a device. Several inventive embodiments of the present invention are described below.

In one embodiment, a method for applying a median filter to a plurality of pixel values associated with a sliding window is provided. The method initiates with defining a merge tree associated with columns corresponding to a sliding window at a first location. Then, a median of a plurality of pixel values defined by the sliding window at the first location is determined. Next, the sliding window is shifted to a second location. Then, the merge tree is modified to correspond to values associated with the second location of the sliding window.

In another embodiment, a method for efficiently filtering pixel values associated with a frame of image data is provided. The method initiates with establishing a first region corresponding to a portion of pixel values associated with a frame of image data. Then, a merge tree associated with the portion of pixel values of the first region is defined. Next, a median value of the portion of pixel values of the first region is determined through the merge tree. Then, a second region is established, the second region partially overlapping the first region. Next, the merge tree is updated such that data associated with the first region is reused to calculate a median value of the second region.

In yet another embodiment, a method for determining a median value in a sliding window environment is provided. The method includes creating a merge tree defining leaf nodes associated with columns corresponding to a first position of a sliding window.

In still yet another embodiment, a computer readable medium having program instructions for determining a median value in a sliding window environment is provided. The computer readable medium includes program instructions for creating a merge tree defining a median associated with a first position of a sliding window.

In another embodiment, a display controller having circuitry for determining a median value for filtering pixel values associated with a frame of image data is provided. The display controller includes circuitry for storing data associated with a merge tree, where the merge tree is based on a number of columns in a window region of the frame of image data. Circuitry for calculating a median value from the data associated with the merge tree is included. Circuitry for identifying a next window region partially overlapping the window region is provided. Circuitry for calculating a median value from the data associated with an updated merge tree is also provided. The data associated with the updated merge tree includes a portion of the stored data from the merge tree.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 6A through 6D are schematic diagrams pictorially illustrating merge trees for three, five, seven and nine columns, respectively, in accordance with one embodiment of the invention.

FIG. 7 is a flow chart diagram illustrating the method operations for setting a sliding window position to the left most eligible location in accordance with one embodiment of the invention.

DETAILED DESCRIPTION OF THE PREFERRED EMBODIMENTS

Figure 1:
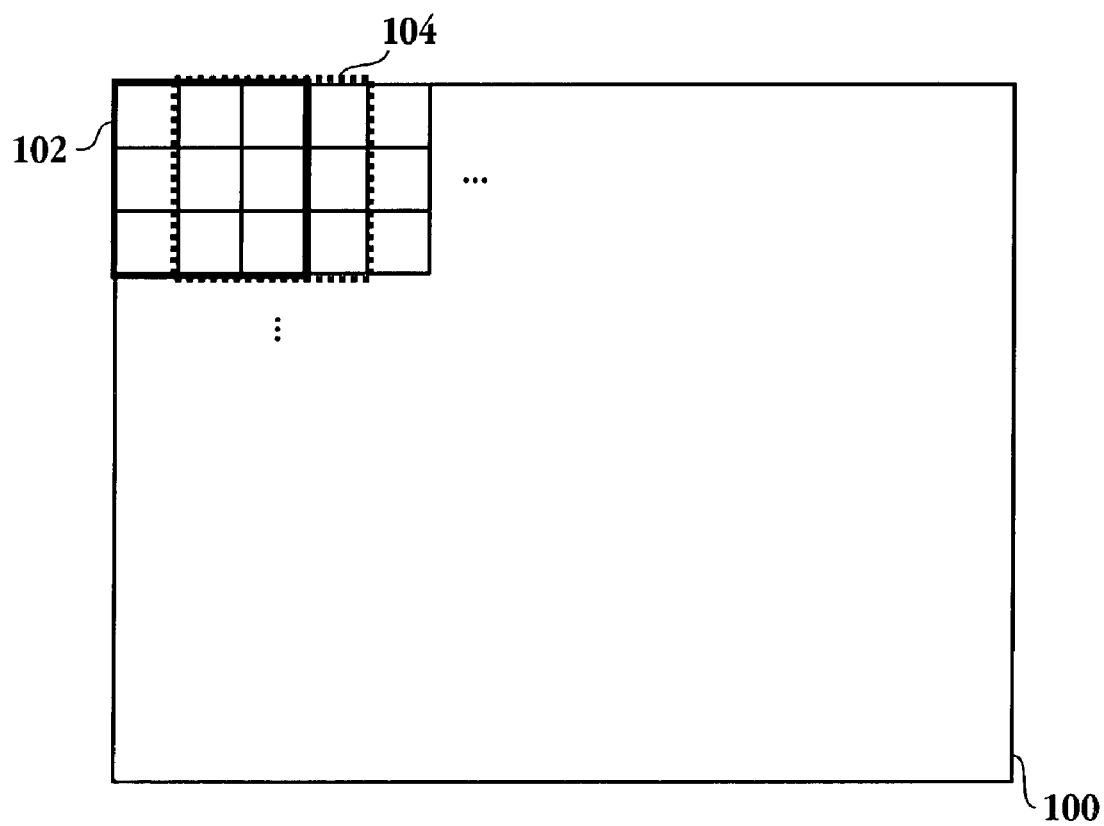
FIG. 1 is a simplified schematic diagram of a 3×3 sliding window illustrating the movement of the window over a grid.

An invention is described for an apparatus and method for determining a median value in a sliding window environment. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section. The term about as used herein refers to +/−10% of the referenced value.

The embodiments of the present invention define a method and apparatus for finding spatial medians in a sliding window environment. The embodiments described herein may be applied to any arbitrary sliding window size. The method and system take advantage of the fact that the sliding window moves incrementally. That is, much of the data between two consecutive regions defined by a sliding window is not new data, therefore, it is not necessary to re-perform calculations associated with this repeated data. In one embodiment, the method and apparatus are utilized as a median filter for image data presented on a display screen. It should be appreciated that the embodiments described below are not limited to a median filter and may be applied to any environment where a defined region advances along a grid of values and it is desirable to determine a location of a certain value within the defined region at each position along the grid. It will be apparent to one skilled in the art that the embodiments described herein are applicable to sliding windows having an odd number of columns.

Figure 2:
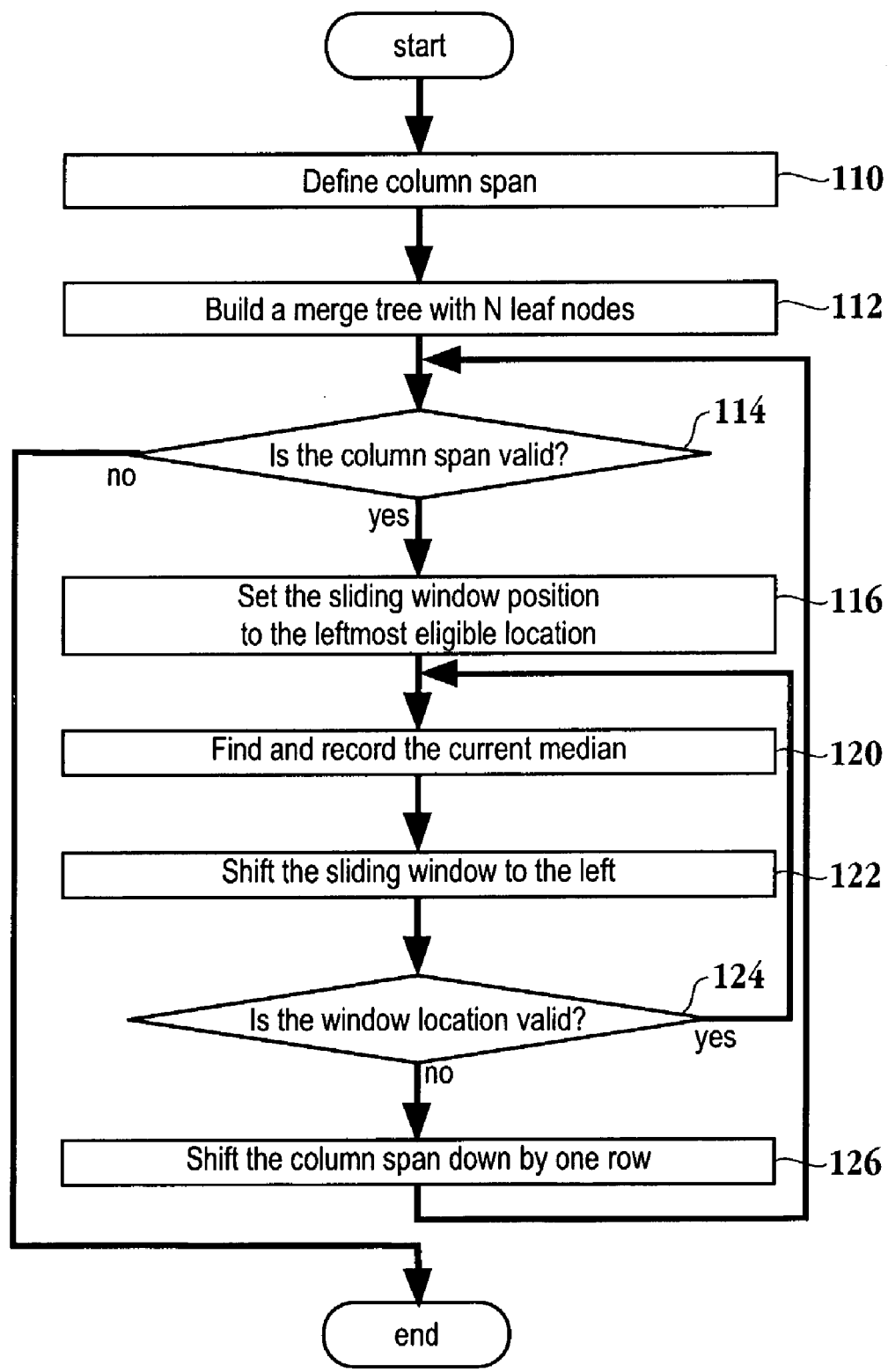
FIG. 2 is a flow chart diagram of method operations for determining a median value for a window region as the window region advances along a grid in accordance with one embodiment of the invention.

FIG. 2 is a flow chart diagram of method operations for determining a median value for a window region as the window region advances along a grid in accordance with one embodiment of the invention. The method initiates with operation 110 where a column span associated with the grid is defined. As used herein, column span refers to a set of rows currently spanning the sliding window region. Consequently, a column will include only pixels or values in the current column span when the grid is defined over a display screen presenting image data. For example, for a rectangle defining the sliding window having N×M dimensions, where M is the number of rows (any integer greater than 0) and N is the number of columns (an odd integer), the column span is defined as the first M rows. Accordingly, the column span indicates where a column begins and ends and represents the vertical position and size of the sliding window as will be illustrated below. The method then advances to operation 112 where a merge tree with N leaf nodes is built. The merge tree is a tree designed to delegate the grouping of columns and the order in which they are merged. The merge tree consists of a number of nodes where each node has either zero or two children. In addition, the merge tree has the property that the child to the left never has more children than the child to the right. It should be appreciated that the merge tree keeps track of the work that has been done in the previous steps and determines the order of operations for finding a current median associated with the region defined by the sliding window. The building of the merge tree is discussed in more detail with reference to FIGS. 3-6.

The method of FIG. 2 then advances to decision operation 114 where it is verified if the column span is valid. Here, a check is performed to verify that the column span is within the vertical bounds of the image being presented on a display screen. If the column span is not within the vertical bounds of the image, then the method terminates. If the column span is within the vertical bounds of the image, then the method moves to operation 116. In operation 116 the sliding window is set to the left most eligible location. For example, where the median is being determined for a group of pixels associated with the frame of image data, the upper left point of the sliding window region is placed to coincide with the upper left most position of the grid of pixels defined by the display screen. That is, the sliding window is placed to the left most position in the current column span. The method then advances to operation 120 where the current median is determined and recorded. Here, the necessary merges and sorts are performed. As will be explained in more detail below with reference to FIG. 8, the median may be calculated by finding the (N×M+1)/2 order statistic in the combination of the two children's arrays.

Still referring to FIG. 2, the method then proceeds to operation 122 where the sliding window region is shifted to the right. For example, the sliding window region may be moved over one column to the right. The method then moves to decision operation 124 where the current window location is checked to determine if it is valid. Here, it is determined if the sliding window remains on the image grid. That is, it is determined if the right edge of the sliding window has reached the right edge of the image grid. If the window location is not valid, then the method advances to operation 126 where the column span is shifted down by one row. The method then returns to decision operation 114 and repeats as described above. If the window location is valid in decision operation 124, then the method returns to operation 120 where the median of the new window location is determined and repeats as described above.

Figure 3:
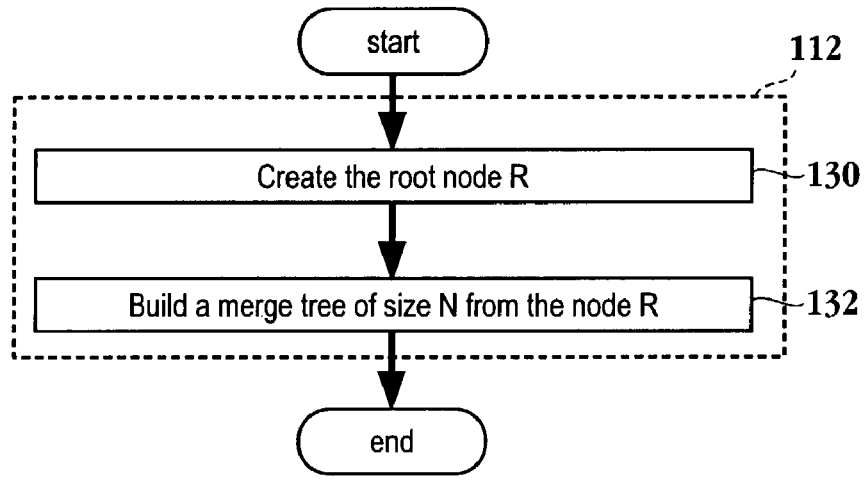
FIG. 3 is a flow chart diagram illustrating the method operations associated with building a merge tree in accordance with one embodiment of the invention.

FIG. 3 is a flow chart diagram illustrating the method operations associated with building a merge tree in accordance with one embodiment of the invention. Here, the flowchart of FIG. 3 further defines the method operations for laying out the structure of the merge tree. The method initiates with operation 130 where a root node (R) is created. The method then advances to operation 132 where a merge tree of size N is built from the root node. It should be appreciated that the building of the merge tree is done recursively, therefore, the method of FIG. 3 describes an entry point that allows for a recursive algorithm to be used. That is, the root node is first created and then a merge tree of size N is recreated in a recursive manner from the root node.

Figure 4:
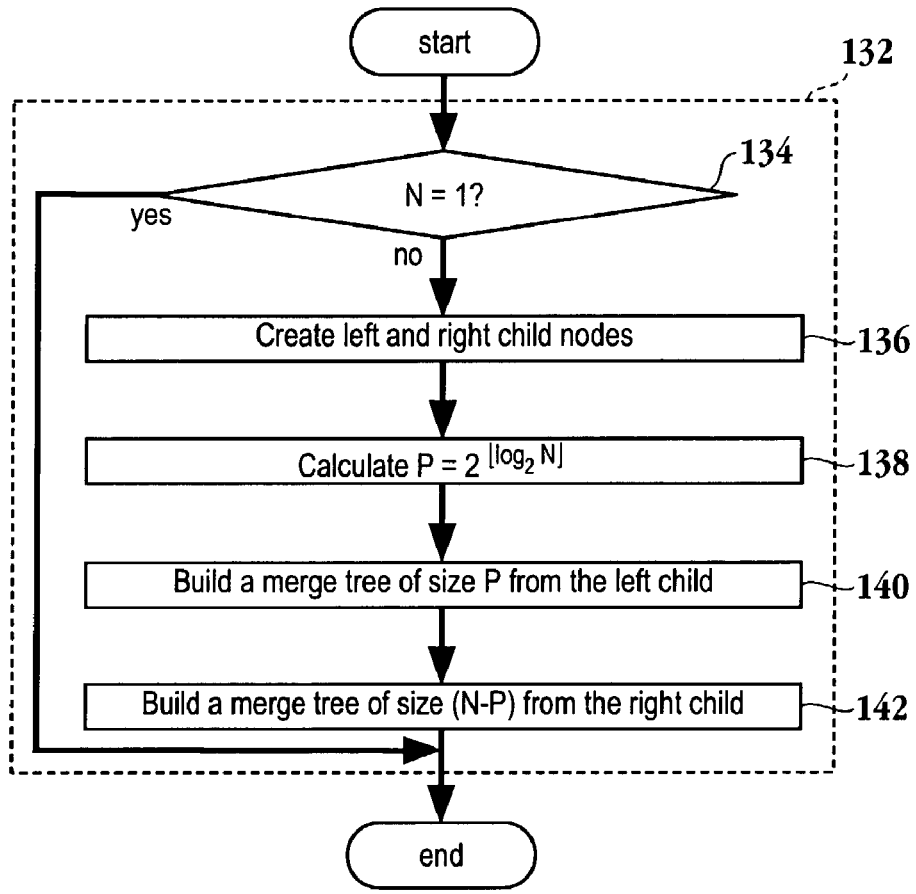
FIG. 4 is a flow chart diagram illustrating the method operations for building a merge tree of size N from the root node in a recursive manner in accordance with one embodiment of the invention.

FIG. 4 is a flow chart diagram illustrating the method operations for building a merge tree of size N from the root node in a recursive manner in accordance with one embodiment of the invention. Thus, the flowchart of FIG. 4 further defines method operation 132 of FIG. 3. The method initiates with decision operation 134 where it is determined if N is equal to the value of one. With respect to FIG. 4, N represents an index value associated with a number of leaf nodes. If N is equal to one, then the method terminates. It should be appreciated that if N is equal to one, then the condition is satisfied because, by definition, the merge tree has one leaf node. If N is not equal to one, then the method advances to operation 136 where left and right child nodes are created.

The method of FIG. 4 then proceeds to operation 138 where a value of P is calculated. Here, P is the largest power of two that is smaller than N. This follows from the fact that every node in a merge tree has the property that its left child (if any) contains a full binary tree with the number of leaf nodes being a power of two. The method then moves to operation 140, where a merge tree the size of P is built from the left child. In operation 142 a merge tree of size (N−P) is built from the right child. It should be appreciated in operations 140 and 142 that the merge trees of size P and (N−P) are recursively created from the child nodes defined in operation 136. It will be apparent to one skilled in the art that the recursive step is a way of breaking down a problem into two smaller problems. That is, P and (N−P) are both smaller than the value of N, therefore, eventually, N will reach the number one.

Figure 5:
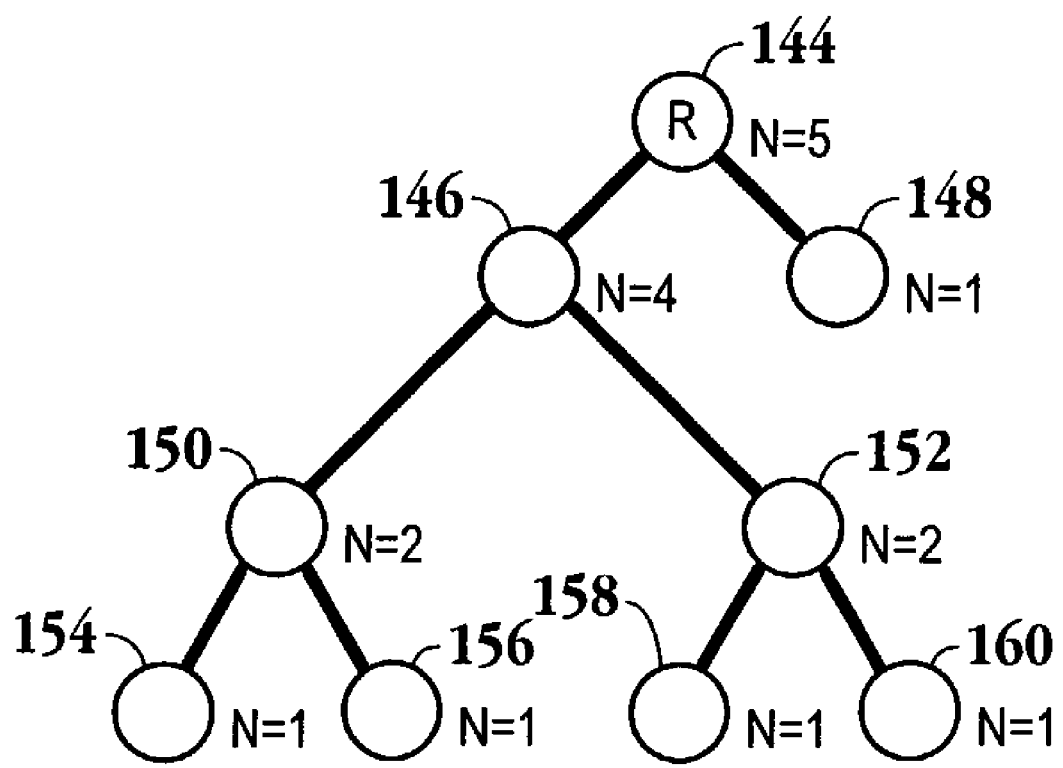
FIG. 5 is a schematic diagram pictorially illustrating the building of a merge tree for a 5×5 sliding window region in accordance with one embodiment of the invention.

FIG. 5 is a schematic diagram pictorially illustrating the building of a merge tree for a 5×5 sliding window region in accordance with one embodiment of the invention. Here, root node, R, 144 is initially defined. As N=5, for the 5×5 sliding window region, left and right child nodes 146 and 148 are created from root node 144, as discussed above with reference to operation 136 of FIG. 4. Moving down the left hand side of the merge tree of FIG. 5, a merge tree of size P is built from the left child. The left child is represented by leaf node 146. In accordance with the recursive manner of the building of the merge tree, right child node 150 and left child node 152 of node 146 are created. Here, the N for parent node 146 is equal to four, therefore the left and right child nodes 150 and 152, respectively, are created. It should be appreciated that the P for a parent node becomes the child's N.

Still continuing down the left hand side of FIG. 5 from node 150, N is not equal to one, therefore a left and right child node, 154 and 156, respectively, are created from node 150. It should be appreciated that N is equal to one for nodes 154 and 156, therefore, a bottom has been obtained for the merge tree going down the left hand side. From node 152, which is the right child of node 146, a merge tree of size (N−P) is built. This results in node 158 and node 160 being defined from node 152. As N=1 for nodes 156 and 158, a bottom has been found. Node 148 is the right child of root node 144. Here, N is equal to five and P is equal to four, therefore, N−P is equal to one and the method will terminated as no other nodes are defined from node 148.

The merge tree associated with a 5×5 sliding window may be thought of as having nodes 154, 156, 158, 160 and 148 representing the five columns of the 5×5 siding window region. As will be explained in more detail below, each of the five columns are sorted and then the columns represented by nodes 154 and 156 are merged to define node 150. The columns represented by node 158 and 160 are also merged, thereby resulting in merge node 152. Nodes 150 and 152 are then merged to define node 146. In turn, nodes 146 and 148 are then combined to define the root node 144, which is associated with the median value of the sliding window region.

FIGS. 6A through 6D are schematic diagrams pictorially illustrating merge trees for three, five, seven and nine columns, respectively, in accordance with one embodiment of the invention. It should be appreciated that the size of a merge tree is determined by counting the number of leaf nodes. The leaf nodes may be defined as the nodes without any children. Thus, for a merge tree associated with three columns, as in FIG. 6A, there are three leaf nodes. Each of the leaf nodes is associated with a column. Furthermore, the index of a leaf node in a merge tree is positioned from the left in respect to other leaf nodes. Accordingly column 1, C1, may be given an index of one, column 2, C2, may be given an index of two, and column 3, C3, may be given an index of three with reference to the three-column configuration of FIG. 6A. The five column configuration of FIG. 6B, the seven column configuration of FIG. 6C, and the nine column configuration of FIG. 6D likewise follow this convention. Additionally, the solid lines connecting each of the nodes of FIGS. 6A-6D represent merge operations, as described with reference to FIG. 5, whereas the dotted lines represent two arrayed look ups. Further information for finding a median value for a two-array look up may be found in U.S. patent application Ser. No. 10/368,234, filed on Feb. 18, 2003 and entitled "Method and System for Finding a K Order Statistic In A Union of Sorted Sets", which has been incorporated by reference. It should be appreciated that while the examples illustrated herein are directed toward sliding window regions that have equal numbers of columns and rows, the invention is not limited to this configuration as the number of columns and rows for a sliding window region may be different with the number of columns being equal to an odd number.

FIG. 7 is a flow chart diagram illustrating the method operations for setting a sliding window position to the left most eligible location in accordance with one embodiment of the invention. Here, the sliding window is set to the left most position in the current column span by initializing the leaf nodes of the merge tree. It should be appreciated that FIG. 7 is a more detailed description of method operation 116 of FIG. 2. The method initiates with operation 162 where each leaf node is associated with a column having a same index. As described with reference to FIG. 6A-6D, column 1 is associated with leaf node one, column 2 is associated with leaf node two, and so on. The method then advances to operation 164 where a next column pointer is set for column N+1. In essence, a place holder is defined here for where to go next.

The method of FIG. 7 then proceeds to operation 166 where "up-to-date" property is set for each node to false. It should be appreciated that each node in the merge tree is associated with an up-to-date property. For a root node, the up-to-date property is not applicable since the up-to-date property is only used by the parent node and the root node has no parent node. However, for each leaf node this property determines whether the contents of a node have been sorted. Furthermore, for each non-leaf node, the up-to-date property determines whether the content of the non-leaf node is the array constructed by merging two arrays from child nodes. Thus, in operation 166, each of the leaf nodes are set to indicate they have not been sorted. Additionally, since all leaf nodes are associated with new columns and no sorting or merging has been performed, the up-to-date property markers for the non-leaf nodes are also set to false to indicate that no merging has been performed.

Figure 8:
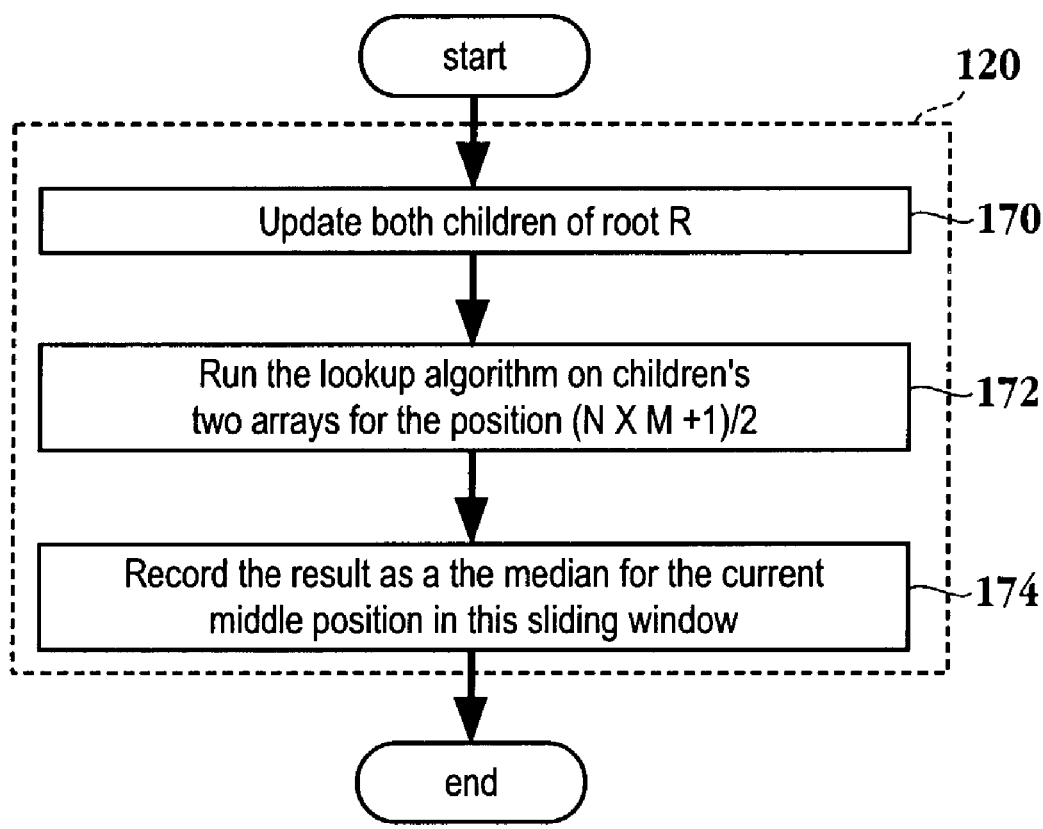
FIG. 8 is a flow chart diagram illustrating the method operations for recursively determining a median associated with a sliding window region in accordance with one embodiment of the invention.

FIG. 8 is a flow chart diagram illustrating the method operations for recursively determining a median associated with a sliding window region in accordance with one embodiment of the invention. It should be appreciated that FIG. 8 is a more detailed description of method operation 120 with reference to FIG. 2. The method initiates with operation 170 where both children of a root node are updated. Here, the up-to-date flag may be set to true as explained in more detail with reference to FIG. 10. The method then advances to operation 172 where the lookup algorithm on the children's arrays for the position (N×M+1)/2 is run. In essence, a K order statistic for two sorted sets is found here, where the K order statistic is the median value. Further details for method operation 172 are described with reference to U.S. patent application Ser. No. 10/368,234, filed on Feb. 18, 2003 and entitled "METHOD AND SYSTEM FOR FINDING A K ORDER STATISTIC IN A UNION OF SORTED SETS," which has been incorporated by reference. The method then proceeds to operation 174 where the result of operation 172 is recorded as the median for the current middle position in the sliding window. It should be appreciated that the result may be stored on any storage media or in a memory region associated with a display screen for which the median value is being calculated.

Figure 9:
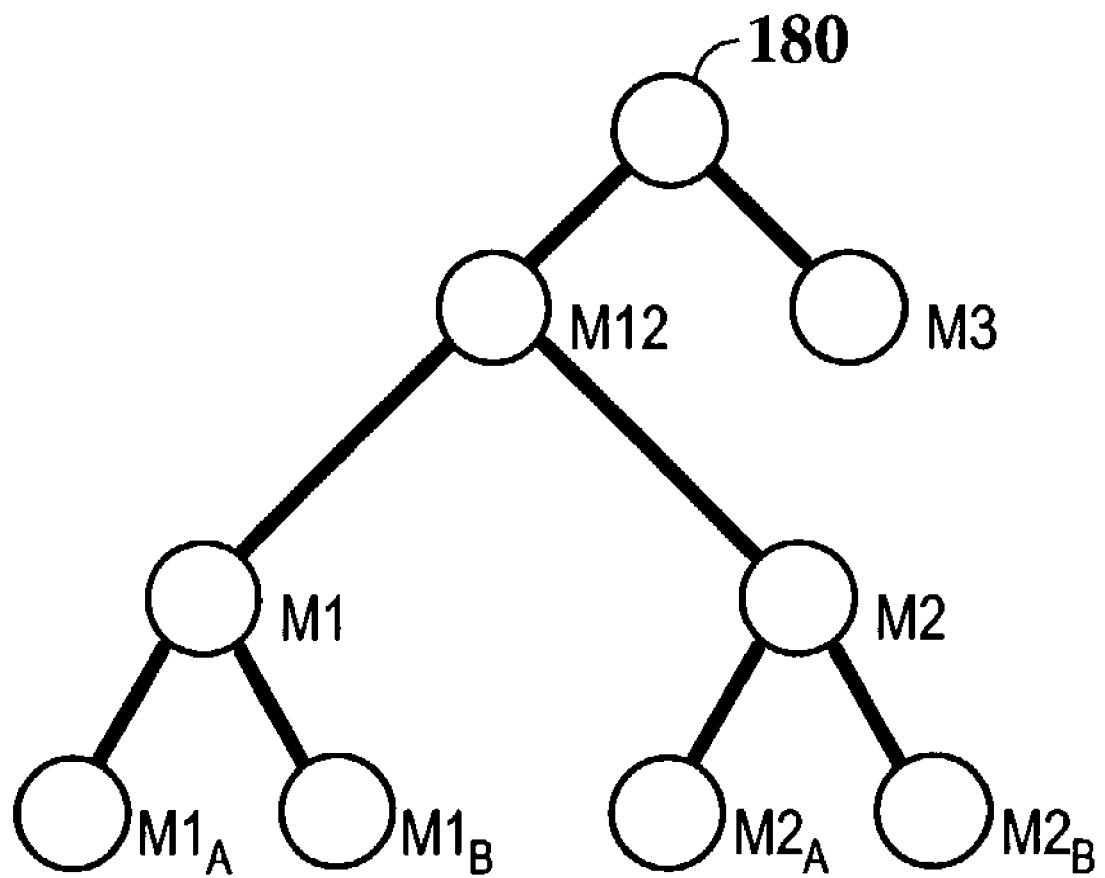
FIG. 9 is a schematic diagram pictorially illustrating the combination of the various arrays associated with a merge tree to determine a median value in accordance with one embodiment of the invention.

FIG. 9 is a schematic diagram pictorially illustrating the combination of the various arrays associated with a merge tree to determine a median value in accordance with one embodiment of the invention. Here, a merge tree associated with a 5×5 spatial window is exhibited. Leaf nodes $M1_A$, $M1_B$, $M2_A$, $M2_B$ and M3 represent the five columns of the 5×5 spatial window. Each of the five columns is sorted, and then the sorted columns are combined in order to arrive at a root node 180 which is associated with the median value to be determined. That is, the columns represented by nodes $M1_A$ and $M1_B$ are merged to define a merged column represented by M1. Similarly, the columns represented by $M2_A$ and $M2_B$ are merged to define a merged column represented by node M2. The values associated with nodes M1 and M2 are then merged to define a node represented as M12, e.g., the merging of data associated with columns 1-4. Finally, two sorted sets represented by M12 and M3 remain, in which a median value may be determined.

Figure 10:
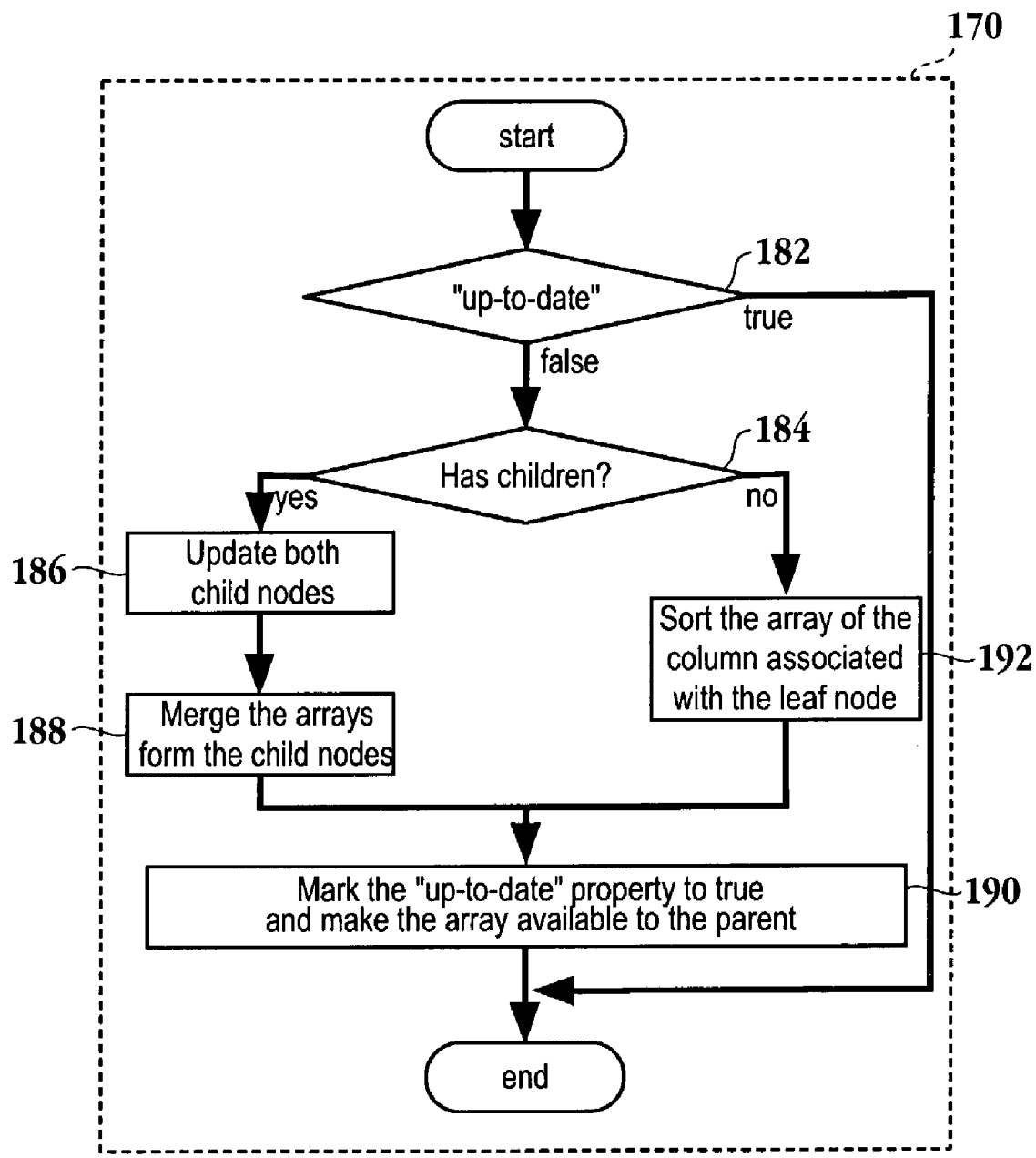
FIG. 10 is a method flow chart illustrating the method operations for updating nodes associated with a merge tree in accordance with one embodiment of the invention.

FIG. 10 is a method flow chart illustrating the method operations for updating nodes associated with a merge tree in accordance with one embodiment of the invention. It should be appreciated that the flow chart of FIG. 10 is a more detailed description of method operation 170 of FIG. 8. The method initiates with decision operation 182 where a state of the up-to-date property is determined. For example, a flag associated with the up-to-date property may be examined here. If a state associated with the up-to-date property is true, then the method terminates. If a state associated with the up-to-date property is false, then the method proceeds to decision operation 184. In decision operation 184, it is determined if the node has children. That is, if the node is a leaf node, or not. If the node has children, i.e., the node is not a leaf node, the method proceeds to operation 186 where both child nodes are updated. As explained previously, a node does not include only one child. The method then moves to operation 188 where the arrays from the child nodes are merged. For example, with reference to FIG. 9, nodes $M1_A$ and $M1_B$, representing data associated with columns 1 and 2, respectively, are merged to define node M1. Consequently, node M1 would be updated, i.e., its up-to-date property is set to true. The method then advances to operation 190 where the up-to-date property is marked as true and the array is made available to the parent. Again, with reference to FIG. 9, the up-to-date property associated with node M1 is marked as true and node M1 is made available to the parent node M12.

If the node does not have children in decision operation 184 then the method proceeds to operation 192. It should be appreciated that if the node does not have children, then it is a leaf node. In operation 192 the array of the column associated with the leaf node is sorted. For example, with reference to FIG. 9, leaf nodes $M1_A$, $M1_B$, $M2_A$, $M2_B$, and M3 may be sorted here. The method then moves to operation 190 and proceeds as described above. It will be apparent to one skilled in the art that the flowchart of FIG. 10 represents a recursive function.

Figure 11:
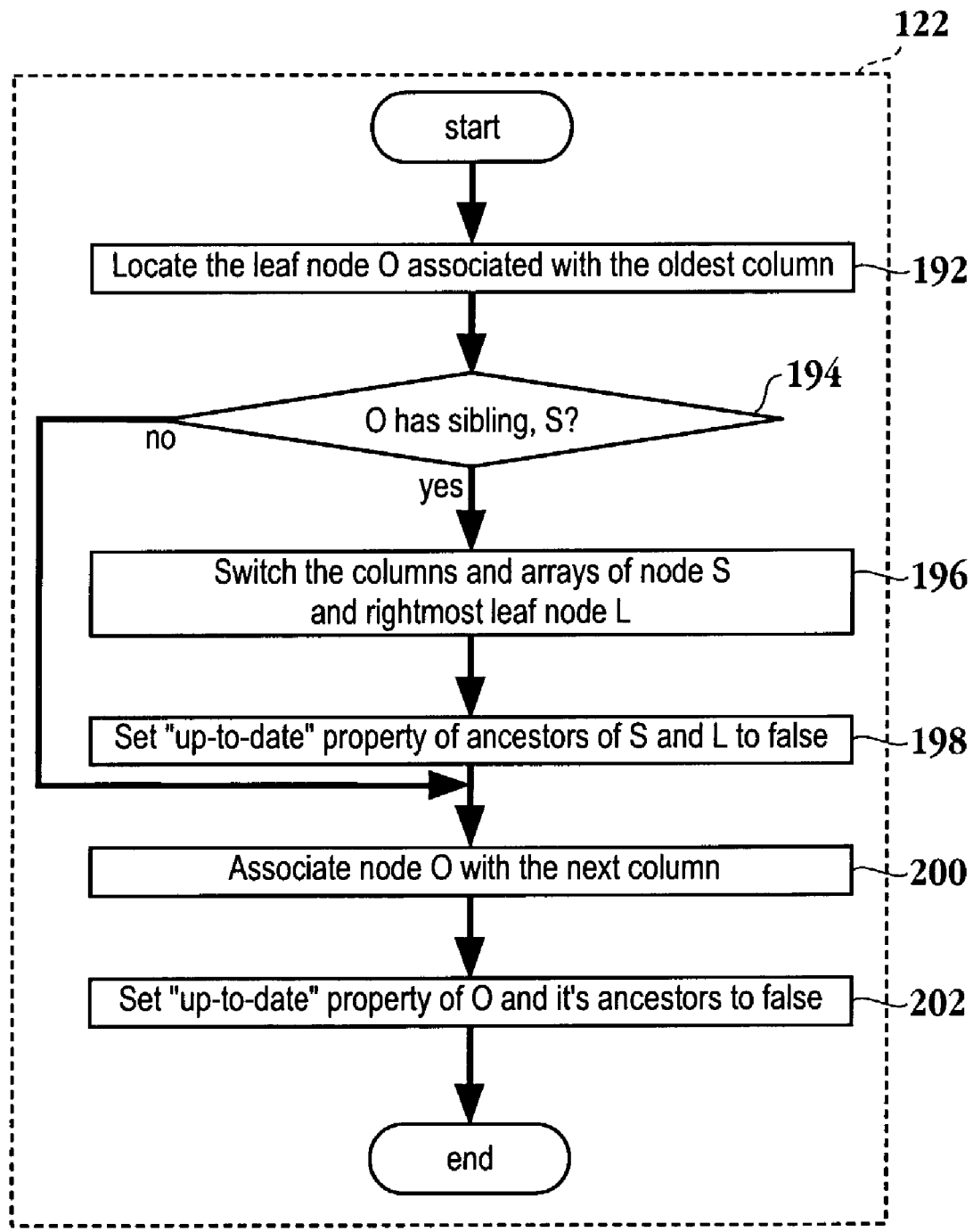
FIG. 11 is a flow chart diagram illustrating the method operations for moving a sliding window one column to the right in accordance with one embodiment of the invention.

FIG. 11 is a flow chart diagram illustrating the method operations for moving a sliding window one column to the right in accordance with one embodiment of the invention. It should be appreciated that FIG. 11 is a more detailed description of method operation 122 with reference to FIG. 2. The method initiates with operation 192 where the leaf node associated with the oldest column is located. It should be appreciated that leaf node O represents the leaf node associated with the oldest column. The method then advances to decision operation 194 where it is determined if leaf node O has a sibling. A sibling of leaf node O is designated by node S. If it is determined that leaf node O has a sibling S, then the method proceeds to operation 196. In operation 196, O's sibling S and the rightmost node L (which has no sibling since N is an odd number), trade their associated columns and sorted arrays, if any. As the columns are switched in operation 196, the up-to-date properties of ancestors of sibling S and rightmost node L are set to false in operation 198. The method then moves to operation 200 where node O is associated with the next column. The method then advances to operation 202 where the up-to-date property of node O, and node O's ancestors is set to false. If it is determined in decision operation 194 that node 0 does not have a sibling S, then the method advances to operation 200 and the method proceeds as described above.

Figure 12A:
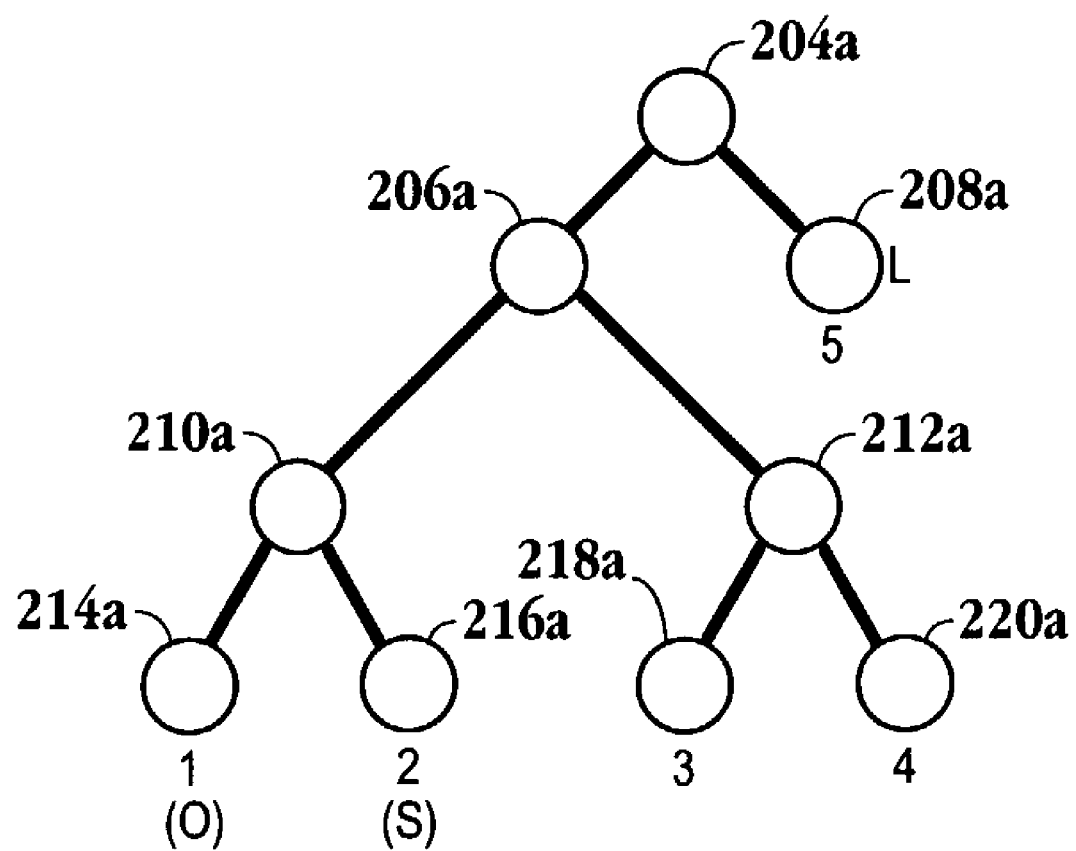
FIGS. 12A and 12B are schematic diagrams pictorially illustrating the method of moving the sliding window one step to the right as described with reference to the flowchart diagram of FIG. 11.
Figure 12B:
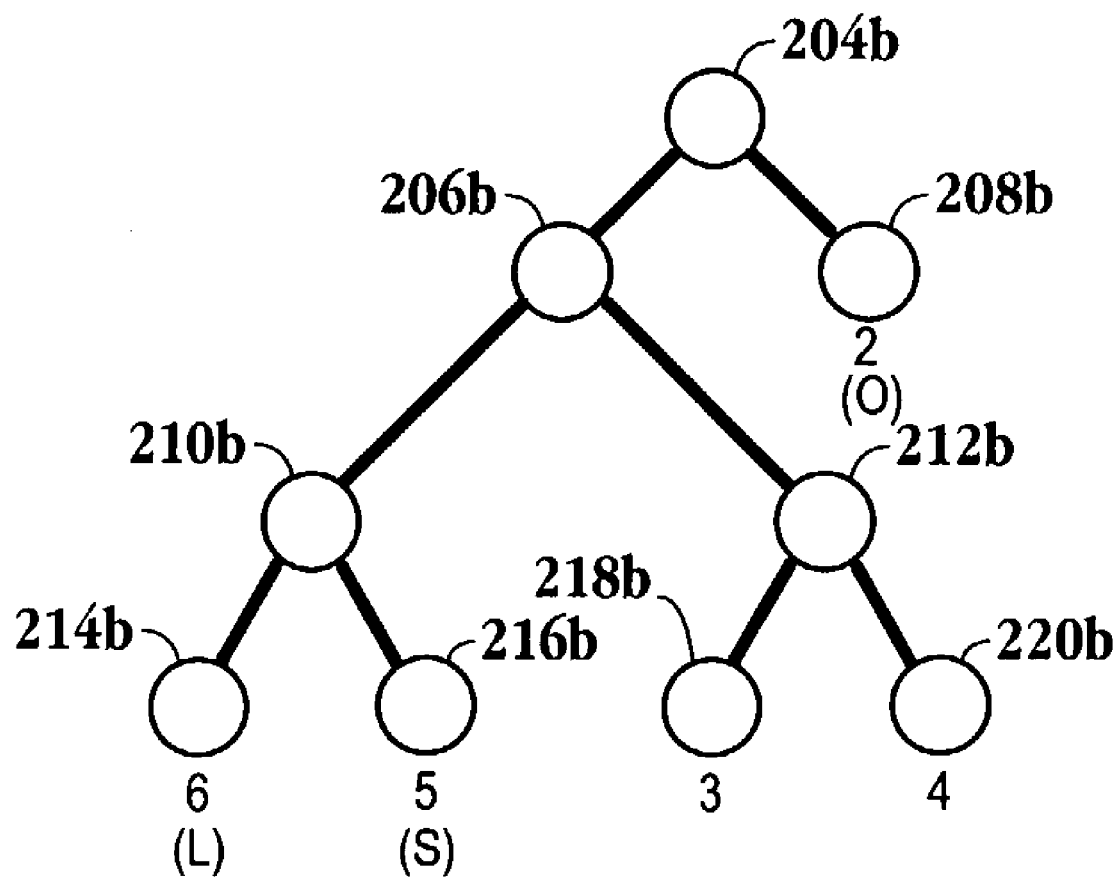

FIGS. 12A and 12B are schematic diagrams pictorially illustrating the method of moving the sliding window one step to the right as described with reference to the flowchart diagram of FIG. 11. FIGS. 12A and 12B illustrate a merge tree associated with a 5×5 sliding window. FIG. 12A illustrates the merge tree having leaf nodes 1-5 associated with columns 1-5, respectively, of the sliding window. In FIG. 12A, root node 204a has children 206a and 208a. Child 206a is a parent of children 210a and 212a. While children 210a and 212a, of parent 206a, are themselves parents of children 214a, 216a, 218a, and 220a. Children 214a, 216a, 218a, and 220a along with node 208a represent leaf nodes associated with columns 1-5, respectively. Here, leaf node 214a, which is associated with column one, which is the oldest column, may be considered leaf node O with reference to FIG. 11. Node 216a, which is associated with column two, is the sibling of node O. Leaf node 208a which is associated with column five, would be considered the rightmost node L with reference to FIG. 11.

Thus, when the 5×5 window shifts one column to the right, the merge tree will change as illustrated in FIG. 12B. Here, node O has a sibling S, therefore, the arrays of node S and rightmost leaf node L are switched. That is, the node for column five 208a is switched with column two 216a. Accordingly, in FIG. 12B, node 216b represents column five. Then, node 1 which is the oldest column, is switched with the data from column six, which is the newest column. Therefore, referring to FIG. 12B, node 214b is associated with column six, which represents the rightmost L when the sliding window shifts one column to the right. It should be appreciated that by following this convention the nodes associated with column three and four in the merged set represented by nodes 218a, 220a, 218b and 220b of FIGS. 12A and 12B, respectively, remain unchanged. Therefore, this data may be reused without having to be recalculated, thereby resulting in efficiencies gained by not having to perform a full recalculation for each incremental move of the sliding window region. That is, one skilled in the art will appreciate that fewer comparisons per median are required by the embodiments described herein.

Figure 13:
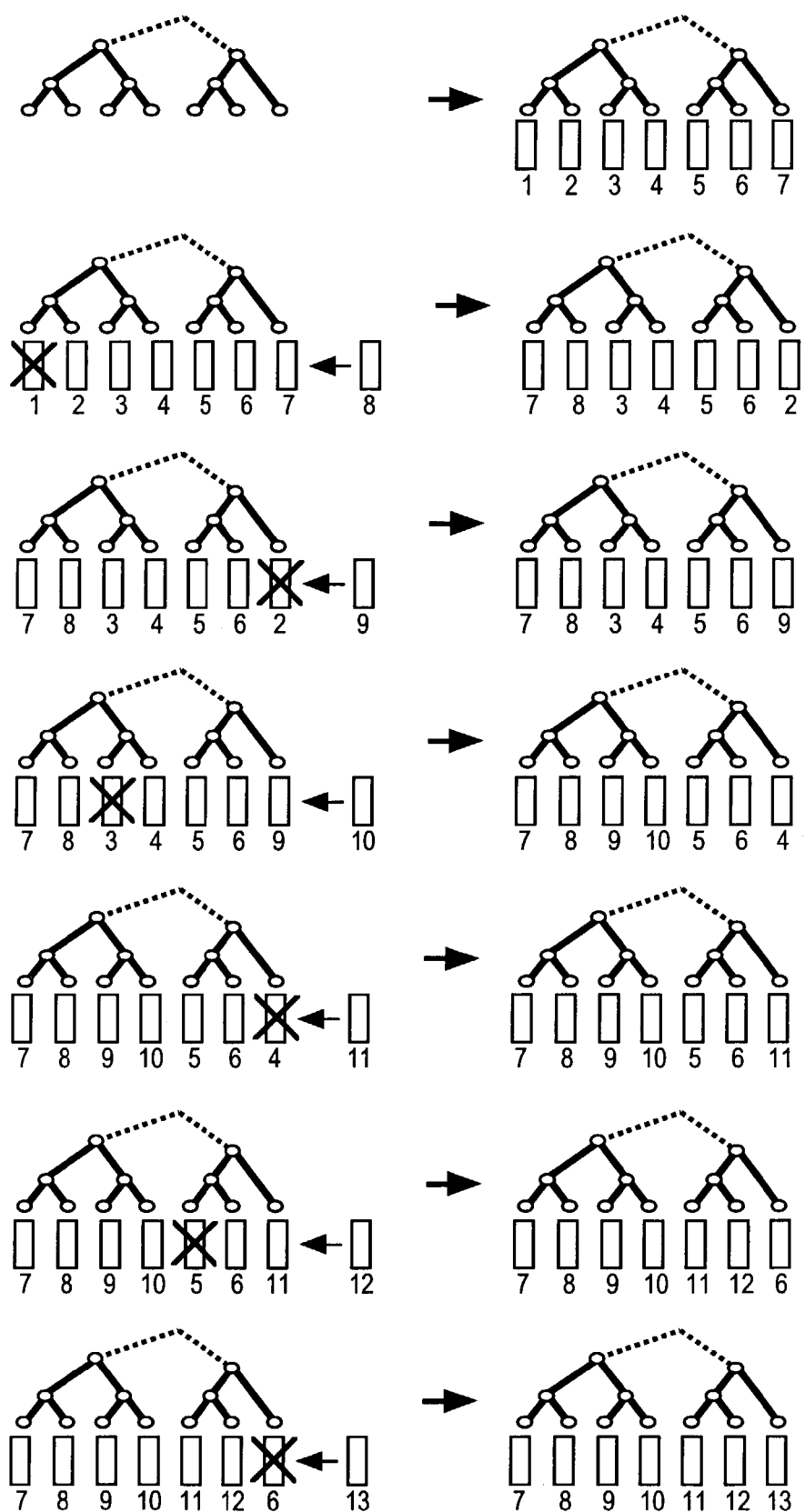
FIG. 13 is a schematic diagram illustrating the progression of the algorithm with regard to the method for moving a sliding window in accordance with one embodiment of the invention.

FIG. 13 is a schematic diagram illustrating the progression of the algorithm with regard to the method for moving a sliding window in accordance with one embodiment of the invention. Here, a merge tree representing a 7×7 sliding window is used. Columns 1-7 are represented by the seven leaf nodes of the merge tree. When it is time to shift the sliding window one column to the left, i.e., add column 8 and remove column 1 from the merge tree, column 2 and column 7 are switched. As described with reference to FIG. 11, the oldest column, represented by the leaf node associated with column 1, has a sibling represented by column 2, therefore, column 2 and column 7 and their associated arrays trade positions. Then the data associated with column 8 replaces the data associated with column 1. Consequently, columns 7 and 8 become siblings. The process repeats itself as the sliding window incrementally shifts to add columns 9-13 as illustrated with reference to FIG. 13. In one embodiment, the left sibling is associated with a column of lesser index than a respective right sibling. One skilled in the art will appreciate that this is an easily accomplished addition done for illustrative reasons so that after 6 replacements a state of the merge tree resembles an initial state, and is not meant to be limiting.

Figure 14:
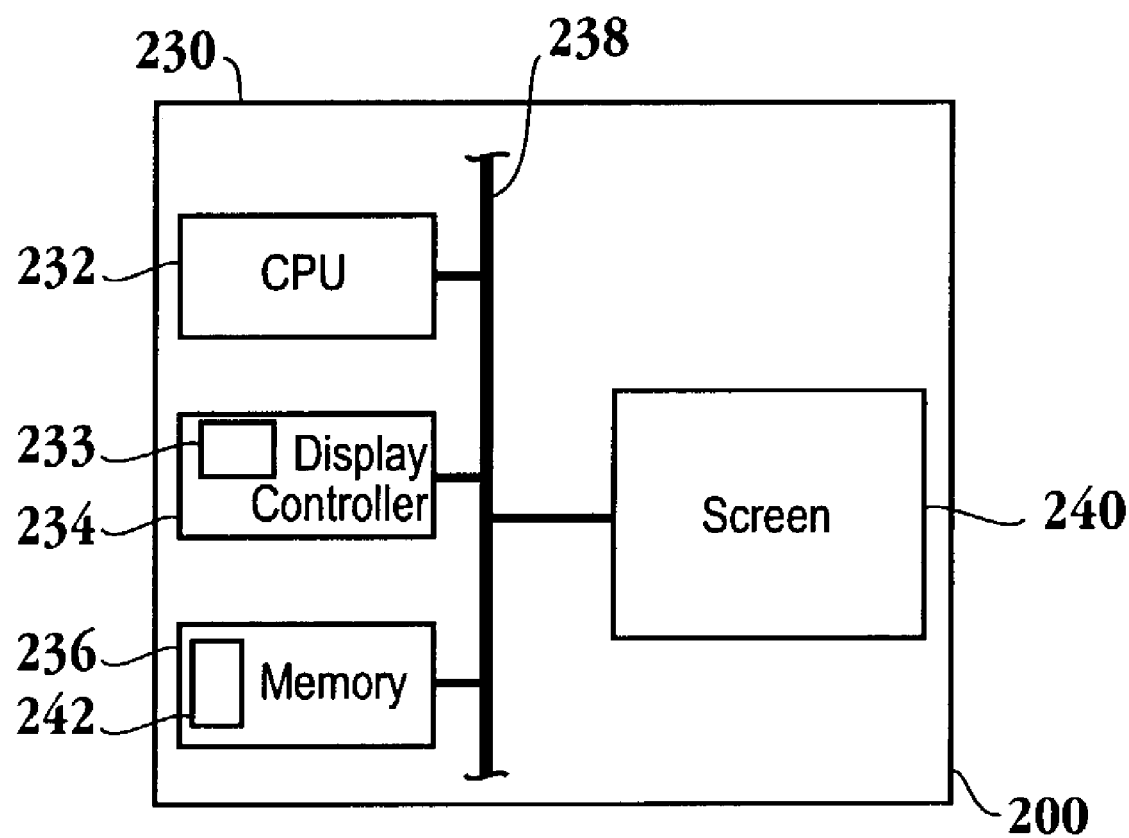
FIG. 14 is a simplified block diagram of the components of a computing device configured to determine a median value associated with a sliding window for the removal of noise within a displayed image in accordance with one embodiment of the invention.

FIG. 14 is a simplified block diagram of the components of a computing device configured to determine a median value associated with a sliding window for the removal of noise within a displayed image in accordance with one embodiment of the invention. Computing device 230 includes central processing unit (CPU) 232 in communication with display controller 234 through bus 238. In one embodiment, display controller 234 is a liquid crystal display (LCD) controller associated with a handheld electronic device. Display controller 234 is in communication with memory 236 and display screen 240 through bus 238. Memory 236 includes region 242 where data associated with a merge tree is stored. Of course, the data associated with the merge tree may be stored on any storage media internal or external to computing device 230. Display controller 234 includes circuitry 233 for calculating a median value from data associated with a merge tree as described herein. It should be appreciated that computing device 230 may be any handheld device or in general any portable electronic device having a display screen controlled by a display controller, e.g., a cellular phone, a personal digital assistant (PDA), a web tablet, a pocket personal computer, a pager, a laptop computer, etc. Additionally, while handheld electronic devices are targeted by the embodiments described herein, the embodiments are also applicable to desktop devices.

In one embodiment, display controller includes circuitry configured to implement the methods described herein. That is, the functionality of the flowcharts described herein may be accomplished through circuitry configured to perform this functionality. Of course, the code performing the location of a median, e.g., as related to image processing applications, may be hard coded onto a semiconductor chip. One skilled in the art will appreciate that the semiconductor chip can include logic gates configured to provide the functionality discussed above. For example, a hardware description language (HDL) can be employed to synthesize the firmware and the layout of the logic gates for providing the necessary functionality described herein.

Figure 15:
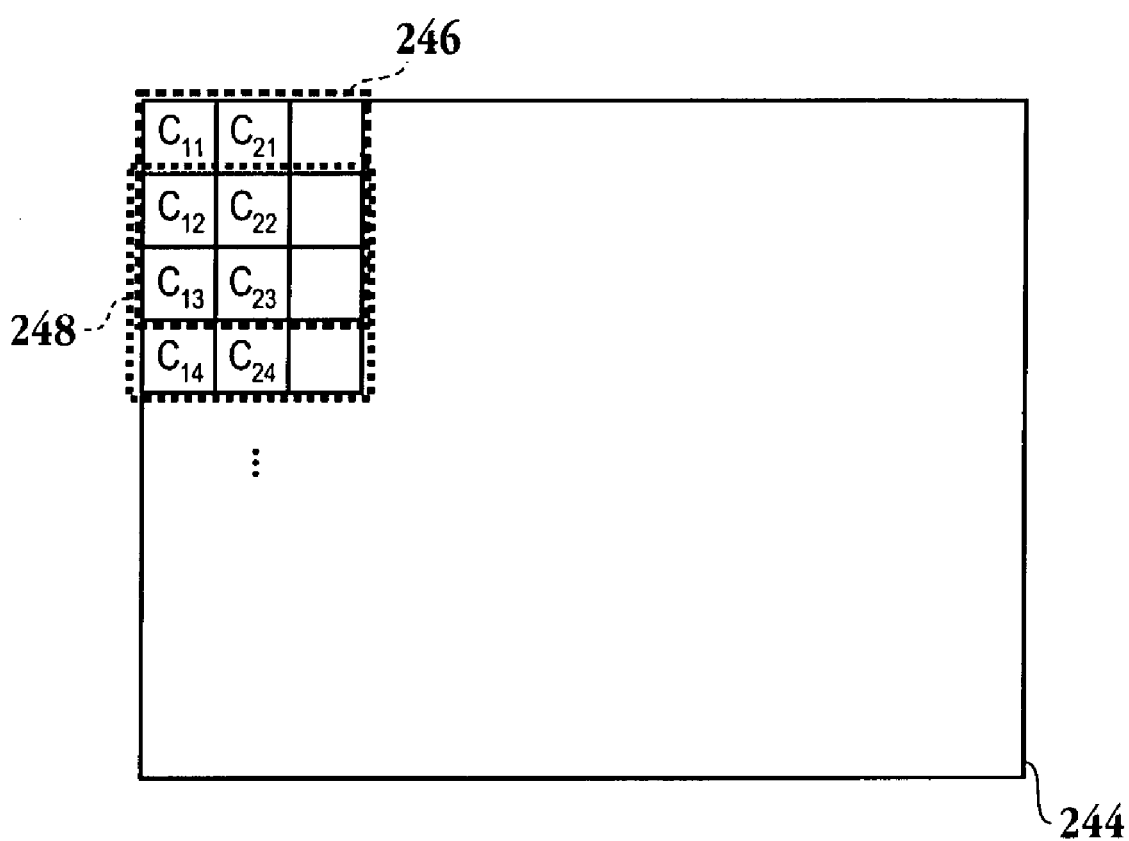
FIG. 15 is a schematic diagram illustrating a spatial cohesion optimization to the scheme for determining a median in a sliding window environment in accordance with one embodiment of the invention.

FIG. 15 is a schematic diagram illustrating a spatial cohesion optimization to the scheme for determining a median in a sliding window environment in accordance with one embodiment of the invention. Here, the sort output from each column in a column span is stored to assist in sorting the column of the same index in the next column span. For example, window 246 defines a 3×3 window of pixel values associated with display screen 244. Column 2 includes values $c_{21}$, $c_{22}$, and $c_{23}$. For the next column span, 3×3 window 248 includes values $c_{22}$, $c_{23}$ and $c_{24}$. Thus, values $c_{22}$ and $c_{23}$ are common to the regions defined by sliding windows 246 and 248. Therefore, by sorting column 2 for sliding window 246, column 2 of sliding window 248 has essentially been sorted. That is, it becomes a matter of removing value $c_{21}$ and inserting the value of $c_{24}$ for the sort of column 2 of sliding window 248. It should be appreciated that the spatial cohesion optimization applies similarly to columns 1 and 3. In general terms, for a window of size M×N defining values for column C in a first column span of $\{c_1, c_2, \ldots c_m\}$, the values are sorted. Then a column associated with the same index for the next column span will have values $\{c_2, c_3, \ldots c_m, c_{m+1}\}$. Accordingly, value $c_1$ may be removed from the sorted array and the value of $c_{m+1}$ inserted into the appropriate position of the sorted array. One skilled in the art will appreciate that this can be done in linear time, e.g., using a method that resembles an insertion sort, thereby improving performance especially with respect to larger window sizes. Of course, the memory requirements will be increased when using the optimization of FIG. 15.

In summary, the above described invention describes a method and system for determining a median in a sliding window environment. It should be appreciated that the embodiments are not limited to a sliding window environment, and are applicable to any environment where a certain value is desired to be determined and the certain value is associated with a region identifying a portion of a group or matrix of values. The region may be moved over the group or matrix of values in an incremental manner allowing data to be reused. The method and the system provides an efficient scheme for applying a 3×3 median filter to digital image data. Additionally, the embodiments may be applied to a larger size filter wherein both the number of rows and the number of columns are odd integers that are not necessarily equal to each other. It will be apparent to one skilled in the art that the method may be implemented in any suitable programming language, e.g., any object oriented programming language. In one embodiment, a Java based implementation of the operations is provided.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for applying a median filter to a plurality of pixel values associated with a sliding window, comprising:
    defining a merge tree associated with columns corresponding to a sliding window at a first location;
    determining a median of a plurality of pixel values defined by the sliding window at the first location;
    shifting the sliding window to a second location; and
    modifying the merge tree to correspond to values associated with the second location of the sliding window including,
        locating an oldest column;
        determining if the oldest column is associated with a sibling;
        if the oldest column is associated with a sibling, then the method includes,
            switching columns associated with a sibling and a rightmost node of the merge tree; and
            replacing the oldest column with a next column;
        if the oldest column is not associated with a sibling, then the method includes,
            replacing the oldest column with the next column.

2. A display controller having circuitry for applying a median filter to a plurality of pixel values associated with a sliding window, comprising:
    circuitry for defining a merge tree associated with columns corresponding to a sliding window at a first location;
    circuitry for determining a median of a plurality of pixel values defined by the sliding window at the first location;
    circuitry for shifting the sliding window to a second location; and
    circuitry for modifying the merge tree to correspond to values associated with the second location of the sliding window including,
        locating an oldest column;
        determining if the oldest column is associated with a sibling;
        if the oldest column is associated with a sibling, then the method includes,
            switching columns associated with a sibling and a rightmost node of the merge tree; and
            replacing the oldest column with a next column;
        if the oldest column is not associated with a sibling, then the method includes,
            replacing the oldest column with the next column.

* * * * *